United States Patent Office 3,197,426
Patented July 27, 1965

3,197,426
COATING COMPOSITION CONTAINING WAX, THERMOPLASTIC PETROLEUM RESIN, AND ETHYLENE-VINYL ACETATE COPOLYMER
Ralph Zaayenga, Drexel Hill, Pa., assignor to Sun Oil Company, Philadelphia, Pa., a corporation of New Jersey
No Drawing. Filed Apr. 7, 1961, Ser. No. 101,371
4 Claims. (Cl. 260—28.5)

This invention relates to a novel wax composition. It particularly relates to a wax composition containing a major proportion of paraffin wax and minor proportions of petroleum resin and the copolymer of ethylene and vinyl acetate, the composition being especially suitable for coating fibrous sheets and containers for packaging liquids.

The use of wax to coat fibrous containers for use in packaging liquids is well known in the art. A particularly useful paraffin wax suitable for coating such containers is described and claimed in U.S. Patent No. 2,624,501. However, actual commercial use has disclosed several disadvantages of coatings formed from this wax. Such coatings on fibrous sheet material may develop minute imprefections which impart a serpentine effect to the coating, thereby creating an unsightly appearance, and leakage of packaged liquid materials through the imperfections may develop. A further difficulty of this wax, as has been found, is the tendency of the coatings formed therefrom to fracture and break away from the fibrous material on suffering an impact so that wax "flakes" are present in the packaged liquid. Such flaking action of a wax is highly undesirable because the product is rendered objectionable to ultimate customers.

The tensile strength and flexibility of petroleum waxes has been improved slightly by the addition thereto of polyethylene. However, such wax mixtures are objectionable in that whatever improvement is attained at relatively warm temperatures, say 73° F., is lost when the wax-polyethylene mixture is cooled to a relatively cool temperature, say 36° F., due, it is thought, to the precipitation of the polyethylene from the wax.

On the other hand, it is known that mixtures of the copolymer of ethylene and vinyl acetate in petroleum waxes produce a wax composition having improved tensile strength and flexibility over mixtures of polyethylene and wax and, in some cases, over petroleum wax itself. However, such mixtures, when formulated for use as a coating composition, have viscosities of extremely high values thereby rendering pumping costs excessive and creating a wax composition from which it is almost impossible to achieve a smooth coating on fibrous materials.

Accordingly, it is an object of this invention to provide a wax composition especially suitable for coating fibrous containers for fluids. A particular object is to provide a wax composition effective for coating paper containers for liquids which imparts a pleasing appearance to the resulting article of manufacture while providing good coverage and good blocking characteristics and which can be readily applied with conventional equipment. A specific object is to provide a wax composition which, when formed as a coating for a fibrous container, will not easily fracture on impact and will have substantially non-flaking characteristics. Another specific object is to provide a means for providing a wax composition having significantly improved non-flaking characteristics but which, at coating temperatures, has significantly lower viscosities. Still another specific object is to provide a container for packaging liquids formed from fibrous sheet material and coated with an adherent non-flaking moisture resistant, primarily wax, coating.

The above and other objects can be obtained by blending the following components: a major proportion of paraffin wax and minor proportions of petroleum resin and copolymers of ethylene and vinyl acetate.

As used herein, melting points are determined by ASTM D87–57, penetrations by ASTM D1321–57T, and viscosities (SUS, Saybolt Universal Seconds) by ASTM D446–57T, unless otherwise stated. All percentages are weight percent.

The components of the wax composition of the present invention are characterized as follows:

WAX A

This is the paraffin wax component. By paraffin wax is meant the crystalline petroleum products which are removed from distillates or overhead stocks, by, say, sweating or solvent extraction. Usually this wax has a melting point between 115° F. and 150° F. It is relatively brittle and consequently is easily fractured. Preferably, however, the paraffin wax component will have a relatively low melting point. A distinctly preferable paraffin wax has a melting point between 125° F. and 132° F., a penetration (at 77° F.) of from 17 to 23, a viscosity (at 210° F.) of from 37 to 41 seconds, and a tensile strength at 40° F. of from 275 p.s.i. to 325 p.s.i., the tensile strength at 40° F. being at least 25 p.s.i. higher than the tensile strength at 70° F. This relatively low melt point paraffin wax may be prepared as follows: A slack wax from the dewaxing of lubricating oil, which may contain about 30% oil, is vacuum distilled and the fraction distilling between about 390° F. and 565° F. at 2 mm. of mercury pressure is collected. This fraction is dissolved in a solvent, preferably a mixture of methyl ethyl ketone and benzene in about equal volumes. Dissolution is performed at an elevated temperature, say, from about 165° F. to 195° F., and advantageously about 6 parts by volume of solvent per part of wax is used. The solution is slowly cooled to a temperature of from 75° F. to 83° F. and the wax which precipitates at this temperature is separated such as by filtration. The solution separated from the precipitated wax is further slowly cooled to a temperature of from 28° F. to 33° F. and the wax which precipitates at this temperature is separated and forms Wax A of the present invention. Preferably, the wax after separation from solution is washed, such as with the solvent employed for dissolution, preferably at the same temperature as used for filtration, namely from 28° F. to 33° F. and the wax is then separated.

PETROLEUM RESIN

The thermoplastic petroleum resin, designated herein as TPR, has a ball and ring softening point above 50° C., more particularly between about 70° C. and 110° C.; an average molecular weight of about 1100, and is a hard solid resin. Typical properties of the resin as used herein for illustrative purposes are as follows:

Softening point, ball and ring _____ 100±3° C.
Specific gravity @ 25/25° C. _____ 0.970–0.975.
Flash point, C.O.C. _____ 500° F.
Fire point _____ 520° F.
Refractive index @ 20° F. _____ 1.5116.
Acid number _____ <1.
Saponification number _____ <2.
Ash _____ 0.2% max.
Iodine number (Wijs) _____ 120.
Iodine number (corrected) _____ 30.
Bromine number _____ 7.3.

According to this invention the petroleum resin, TPR, is the polymerization product obtained by catalytically reacting a mixture of monomers composed essentially of dienes and reactive olefins and having an average molecular weight of about 90 to produce a hard solid resin utilizing a Friedel-Crafts type catalyst.

Specifically, as an example, the charge material for producing this resin is the petroleum fraction boiling 90% below 125° C. which is recovered from deeply cracked, e.g., thermally or catalytically, and subsequently refined and fractionated petroleum stock. This low-boiling fraction is characterized as containing at least 10% of conjugated diolefins, a total of at least 20% conjugated diolefins and readily polymerizable olefins, and a negligible amount of butadiene and isoprene. It is further characterized as being composed of $C_5$, $C_6$, and $C_7$ hydrocarbons but is devoid or approximately devoid of polymerizable aromatics such as styrene, methyl styrene, indene, and methyl indene. A typical charge material may have th following analysis:

About 23% aromatics composed chiefly of benzene and toluene, about 19% of conjugated diolefins, and about 23% of readily polymerizable olefins, with about 12% represented by saturates and less.

The petroleum resin of this invention is prepared, for example, by contacting the above-described charge material with 0.5% to 2.5% by weight of a metal halide catalyst selected from the group consisting of aluminum chloride and aluminum bromide at a temperature within the range of about 0° C. and 60° C., preferably between 30° C. and 50° C. The reaction time may vary from one to three hours. Following a suitable reaction time, the reaction is killed by adding a dilute sulfuric acid solution (4–5% $H_2SO_4$) in order to repress the hydrolysis of the, say, aluminum chloride; given a thorough water wash, followed by an alkaline wash with, for example, a 30% solution of KOH. The solvent content of the reaction mixture is distilled off and the solid resin is recovered subsequently by, say, steam distillation.

It may be desirable to subject the resin solution prior to solvent removal to a dechlorination treatment for the removal of residual hydrogen chloride in organic complexes.

COPOLYMER

The method of copolymerizing ethylene and vinyl acetate is described and claimed in U.S. Patent No. 2,200,429. Generally, the copolymer or interpolymer is obtained by heating a mixture of ethylene and vinyl acetate at a temperature of 100° C. to 400° C. under a pressure of more than 500 atmospheres. Typically, such copolymers can be prepared by copolymerizing a mixture of ethylene and vinyl acetate in the presence of an oxygen catalyst at pressures of from 15,000 to 30,000 p.s.i.g. and at temperatures of from 150° C. to 250° C.; then, separating the resultant copolymer from unreacted monomers. The composition of the copolymer may be from 5 to 25 moles of ethylene per mole of vinyl acetate with the melt index varying from 0.5 to 1000. Specifically, the copolymer used herein for illustrative purposes contains about 25 weight percent vinyl acetate. As used herein, the symbol for such copolymer is PEVA.

The above-specified components in specific combination make up the wax composition of the present invention. The incorporation of these components into the wax composition can be by any convenient means, such as by blending the wax in molten state together with the resin and copolymer to obtain a homogeneous blend.

The solvent designated in the methods of preparing the wax component may be of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, hexane, or alcohols such as propyl or the heptyl alcohols.

The Tinius-Olsen angle of fracture test used herein to evaluate the flaking properties of waxes is performed on the Tinius-Olsen Stiffness Tester. The procedure is as follows: Wax is formed into strips of specified dimensions (0.16 inch thick by 0.5 inch wide by 2 inches long) by solidifying molten wax on the surface of water to form the desired thickness, and cutting to the other dimensions. These wax strips are placed on the Tinius-Olsen Stiffness Tester and are evaluated for angle of fracture at 73° F. and 36° F. This angle of fracture as measured by this apparatus is the angle to which the specimen may be bent without complete fracture.

Thus, it is desirable to formulate a wax composition which will, under test, fracture at a high angle of deformation. An angle of 90° is the maximum deformation that can be measured on this instrument. However, for practical reasons, the maximum angle usually measured is 78°. Therefore, the number 78° should be interpreted as 78°+.

The angle of fracture values at 73° F. and 36° F. are necessary for complete definition of flaking properties of the specimen. However, the angle of fracture at 36° F. is the critical value because this temperature corresponds to the refrigeration temperature to which, say, milk cartons are exposed. The flaking characteristics are evaluated by determining the grams of wax which flake off per 1000 milk cartons of one quart size, after subjecting the milk cartons to the standard drop test. Accordingly, the amount of flaking to be expected from a wax composition has been correlated with the angle of fracture at 36° F. as follows:

| Flaking, grams: | Tinius-Olsen angle of fracture at 36° F. |
|---|---|
| 0 | 19+ |
| 3 | 17 |
| 6 | 15 |
| 14 | 11 |
| 20 | 9 |
| 50+ | 7– |

Actual experience has shown that a wax composition with substantially non-flaking characteristics must have a minimum angle of fracture at 36° F. of 15° and at 73° F., a minimum of 20°. On the other hand, the commercially available waxes of the art, such as the wax described in U.S. Patent No. 2,624,501 will have an angle of fracture at 36° F. of about 7° which represents about 50 grams of wax flaking per 1000 milk cartons of one quart size.

"Non-flaking" as used herein is, in general, applicable to wax compositions which result in wax flaking from 0 to 6 grams of wax per 1000 milk cartons. More particularly, "non-flaking" is applicable to wax compositions having a Tinius-Olsen angle of fracture at 36° F. of from 15° to 78°+ and at 73° F. of from 20° to 78°+, i.e., the higher the angle of fracture value at 36° F., the better the wax composition will be to flaking resistance.

The present invention includes wax composition containing the above-specified components in the following specified ranges:

| Component: | Weight percent concentration range |
|---|---|
| Wax A | 51–90 |
| PEVA | 5–25 |
| TPR | 5–24 |

The preferred composition range for the present invention is:

| Component: | Amount |
|---|---|
| Wax A | 65–75 |
| PEVA | 17.5–20 |
| TPR | 7.5–15 |

An excellent example of the wax composition of the invention is a blend of:

| | Percent |
|---|---|
| Wax A | 70 |
| PEVA | 20 |
| TPR | 10 |

The above wax composition had a Tinius-Olsen angle of fracture at 36° F. of 78+ and at 73° F. of 78+ which according to the above correlation is equivalent to no wax flaking (zero grams) per 1000 milk cartons.

As used herein, a wax composition designated expressly or by omission as containing "zero" oil content includes inherently or additionally, an oil content of less than 1.0%.

*Example 1*

A commercially available copolymer (PEVA) having a mole ratio of ethylene to vinyl acetate of 8 to 1 was blended into the preferred Wax A. Upon solidifying and testing, the following results were obtained:

| Wax A | PEVA | Angle of Fracture ||
|---|---|---|---|
| | | 73° F. | 36° F. |
| 100 | 0 | 7 | 5 |
| 98 | 2 | 11 | 6 |

It is noted that PEVA has essentially no effect on the low temperature flaking characteristics of paraffin wax. The benefit obtained at 73° F. (increase from 7° to 11°) is of no practical value when the composition is used to coat milk containers which are refrigerated at approximately 36° F.

*Example 2*

The following blends illustrate the fact that PEVA, plus a laminating microcrystalline wax having a 153° F. melt point blended into Wax A does not produce a substantially non-flaking wax.

| Wax A | PEVA | Micro | Angle of Fracture ||
|---|---|---|---|---|
| | | | 73° F. | 36° F. |
| 88 | 2 | 10 | 13 | 8 |
| 83 | 2 | 10 | 13 | 8 |

By comparing with Example 1, it is noticed that the microcrystalline wax component has essentially no effect on the 73° F. angle of fracture and tends to raise the 36° F. angle of fracture.

*Example 3*

The wax composition of Example 1 was repeated but by using increased amounts of PEVA as follows:

| Wax A | PEVA | Angle of Fracture || Viscosity 210° F., SUS |
|---|---|---|---|---|
| | | 73° F. | 36° F. | |
| 90 | 10 | 78+ | 12 | 277 |
| 80 | 20 | 78+ | 26 | 4,000+ |

From a flaking resistance standpoint, the 10% blend is of unsatisfactory quality (equivalent to about 14 grams of wax flakes per 1000 cartons). The other blend is satisfactory in non-flaking quality, but from a viscosity standpoint, the 4000+ seconds is an intolerable viscosity for coating fibrous materials. In many cases, under such conditions the pumping costs would be excessive, the consumption of wax would be excessive, and the coverage, blocking, and appearance would be poor.

*Example 4*

A commercially available TPR having properties as above-described was blended into the preferred molten Wax A. Upon solidifying and testing, the following results were obtained:

| Wax A | TPR | Angle of Fracture ||
|---|---|---|---|
| | | 73° F. | 36° F. |
| 100 | --- | 4 | 4 |
| 90 | 10 | 37 | 7 |

It is concluded from the above that a petroleum resin blended only with Wax A does not produce a substantially non-flaking wax.

*Example 5*

Equal amounts of TPR plus PEVA were blended into molten Wax A. Upon solidifying and testing, the following results were obtained:

| Wax A | PEVA | TPR | Angle of Fracture || Viscosity at 210° F., SUS |
|---|---|---|---|---|---|
| | | | 73° F. | 36° F. | |
| 80 | 10 | 10 | 78+ | 15 | 339 |

The above wax composition has good flaking resistance, namely, six grams of wax per 1000 cartons. In addition, the viscosity of the blend is approximately the same as the 10% PEVA composition of Example 3. Thus, at the usual coating temperatures of 195° F. to 240° F., the addition of a petroleum resin to the base blend will allow the handling of substantially non-flaking wax blends at an appreciably lower viscosity.

*Example 6*

Additional blends of Wax A containing PEVA and varying amounts of TPR were made with the following results:

| Wax A | PEVA | TPR | Angle of Fracture ||
|---|---|---|---|---|
| | | | 73° F. | 36° F. |
| 75 | 20 | 5 | 78 | 17 |
| 72.5 | 20 | 7.5 | 78 | 78 |
| 70 | 20 | 10 | 78 | 78 |
| 65 | 20 | 15 | 78 | 59 |
| 60 | 20 | 20 | 78 | 22 |

By comparison with the previous examples, it is noted that the above blends represent a remarkable improvement in non-flaking wax compositions. For example, the 20% PVA composition from Example 3 had a 36° F. rating of 26, which is considered "excellent" from a flaking standpoint. However, the viscosity of such a blend is intolerable. On the other hand, the 10% TPR blend from Example 4 was extremely poor in flaking resistance (a 7° reading at 36° F. is equivalent to 50+ grams of wax flaking per 1000 milk cartons). Further, from Example 5 it is seen that equal amounts at the 10% level of PEVA and TPR do overcome the viscosity problem and so compose a satisfactory flaking wax composition. However, the above blends represent superior wax compositions. The 7.5% to 15% TPR, plus 20% PEVA in wax blends are unequaled in flaking resistance quality ("zero" grams of flaking).

*Example 7*

From Example 6, it is noted that 10% TPR represents about the optimum quantity of resin to achieve the desired benefit. The following results demonstrate the effect of varying the amount of PEVA in the TPR-wax blends:

| Wax A | TPR | PEVA | Angle of Fracture ||
|---|---|---|---|---|
| | | | 73° F. | 36° F. |
| 90 | 10 | -------- | 37 | 7 |
| 80 | 10 | 10 | 78 | 15 |
| 77.5 | 10 | 12.5 | 78 | 7 |
| 75 | 10 | 15 | 71 | 9 |
| 72.5 | 10 | 17.5 | 78 | 22 |
| 70 | 10 | 20 | 78 | 78 |

The above data indicate that at least 17.5% PEVA is needed to produce a non-flaking wax composition containing 10% TPR, e.g., a wax composition having "zero" grams of wax flakes at 36° F.

Thus, it is concluded from the above examples that substantially non-flaking wax compositions can be blended from 51% to 90% paraffin wax, 5% to 24% petroleum resin, and 5% to 25% of the copolymer of ethylene and vinyl acetate.

On storing wax slabs prepared from the composition of the present invention for long periods of time under ambient temperature conditions, which includes a temperature of about 90° F., no blocking of the slabs is observed.

The present wax composition is primarily intended for use in coating fibrous fluid containers, particularly cardboard milk containers, which may be advantageously accomplished by dipping or spraying the containers in or with molten wax. The present wax composition may be used in many other applications, especially where high tensile strength and low temperature flexibility and adherence is desirable, such as in the coating of metal fluid containers, canvas impregnation, coating paper drinking cups, adhesive formulations, i.e., coating packaging materials in general.

Furthermore, it is recognized that the wax compositions of the present invention may have added thereto various additives, such as anti-oxidants in amounts ranging from 0.0015% to 2%. Certain amides may also be incorporated to, for example, reduce frictional drag of a wax coated milk carton moving through conventional packaging equipment.

I claim:

1. A wax composition having substantially non-flaking characteristics and consisting essentially of 51–90% of paraffin wax, 5–24% of petroleum resin, and 5–25% of the copolymer of ethylene and vinyl acetate, said petroleum resin being obtained by polymerizing, in the presence of a Friedel-Crafts catalyst, a mixture of olefins, said olefins consisting essentially of aliphatic olefins containing 5–7 carbon atoms and having an average molecular weight of about 90, at least 10% of said olefins being conjugated diolefins, to produce a solid resin.

2. A container for packaging liquids formed from fibrous sheet material and provided with an adherent substantially non-flaking coating, said coating being a hydrocarbon composition consisting essentially of 51% to 90% paraffin wax, 5–24% petroleum resin, and 5–25% of the copolymer of ethylene and vinyl acetate; said petroleum resin being obtained by polymerizing, in the presence of a Friedel-Crafts catalyst, a mixture of olefins, said olefins consisting essentially of aliphatic olefins containing 5–7 carbon atoms and having an average molecular weight of about 90, at least 10% of said olefins being conjugated diolefins, to produce a solid resin.

3. A container for packaging liquids formed from fibrous sheet material and provided with an adherent substantially non-flaking coating, said coating being a hydrocarbon composition consisting essentially of 51–90% paraffin wax having a melt point between 125° and 132° F., a viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5–24% petroleum resin; and from 5–25% of the copolymer of ethylene and vinyl acetate; said petroleum resin being obtained by polymerizing, in the presence of a Friedel-Crafts catalyst, a mixture of olefins, said olefins consisting essentially of aliphatic olefins containing 5–7 carbon atoms and having an average molecular weight of about 90, at least 10% of said olefins being conjugated diolefins, to produce a solid resin.

4. In the preparation of a wax composition for use in coating liquid containers consisting essentially of 51–90 parts paraffin wax and 5–25 parts of the co-polymer of ethylene and vinyl acetate, the improvement which comprises admixing, additionally thereto a viscosity reducing proportion in the range of 5–24 parts of a petroleum resin; said viscosity being measured at a temperature between 195° and 240° F.; said petroleum resin being obtained by polymerizing, in the presence of a Friedel-Crafts catalyst, a mixture of olefins, said olefins consisting essentially of aliphatic olefins containing 5–7 carbon atoms and having an average molecular weight of about 90, at least 10% of said olefins being conjugated diolefins, to produce a solid resin.

References Cited by the Examiner

UNITED STATES PATENTS

| 2,490,550 | 12/49 | Sermattei | 260—28.5 |
| 2,877,196 | 3/59 | Reding | 260—28.5 |
| 2,985,538 | 5/61 | Padgett et al. | 229—3.1 |

FOREIGN PATENTS 531,202 10/56 Canada.

MORRIS LIEBMAN, *Primary Examiner.*

EARLE J. DRUMMOND, *Examiner.*